US009766992B2

(12) United States Patent
Wipfel et al.

(10) Patent No.: US 9,766,992 B2
(45) Date of Patent: Sep. 19, 2017

(54) STORAGE DEVICE FAILOVER

(71) Applicant: Fusion-io, Inc., Salt Lake City, UT (US)

(72) Inventors: Robert Wipfel, Draper, UT (US); Bart Van Assche, Merelbeke (BE); Ranjan Gupta, Salt Lake City, UT (US)

(73) Assignee: SANDISK TECHNOLOGIES LLC, Plano, TX (US)

( * ) Notice: Subject to any disclaimer, the term of this patent is extended or adjusted under 35 U.S.C. 154(b) by 91 days.

(21) Appl. No.: 14/231,051

(22) Filed: Mar. 31, 2014

(65) Prior Publication Data

US 2015/0121134 A1 Apr. 30, 2015

Related U.S. Application Data

(60) Provisional application No. 61/898,187, filed on Oct. 31, 2013.

(51) Int. Cl.
*G06F 11/00* (2006.01)
*G06F 11/20* (2006.01)
*G06F 11/14* (2006.01)

(52) U.S. Cl.
CPC ...... *G06F 11/2094* (2013.01); *G06F 11/1482* (2013.01)

(58) Field of Classification Search
CPC ............. G06F 11/2053; G06F 11/2094; G06F 11/1425; G06F 11/2069; G06F 11/2087; G06F 11/2041; G06F 11/2028; G06F 11/1658
See application file for complete search history.

(56) References Cited

U.S. PATENT DOCUMENTS

| 7,124,320 | B1 | 10/2006 | Wipfel | |
|---|---|---|---|---|
| 7,590,737 | B1 * | 9/2009 | Chen | G06F 11/004 709/223 |
| 7,664,991 | B1 * | 2/2010 | Gunda | G06F 11/1443 714/43 |

(Continued)

OTHER PUBLICATIONS

Scott Tracy, Target Port Group Support (TPGS) in the Solaris OS, Jun. 2007.*

(Continued)

*Primary Examiner* — Bryce Bonzo
*Assistant Examiner* — Jonathan Gibson
(74) *Attorney, Agent, or Firm* — Kunzler Law Group, PC

(57) ABSTRACT

Techniques are disclosed relating to storage device failover. In one embodiment, a plurality of storage devices are represented as cluster resources to a cluster resource manager that manages cluster resources on a plurality of cluster nodes. An indication may be received that a failover operation is requested with respect to one of the plurality of storage devices. In response to the indication, the cluster resource manager may initiate the failover operation. In some embodiments, the failover operation includes changing a first access state of the storage device and a second access state of another storage device. In such an embodiment, the storage device and the other storage device may be associated with a logical unit number. In some embodiments, the storage device is located within a first of the plurality of cluster nodes; the other storage device is located within a second of the plurality of cluster nodes.

20 Claims, 6 Drawing Sheets

(56) References Cited

U.S. PATENT DOCUMENTS

| | | | | |
|---|---|---|---|---|
| 2006/0112297 A1* | 5/2006 | Davidson | ............ | G06F 11/1438 |
| | | | | 714/2 |
| 2009/0328024 A1* | 12/2009 | Li | ....................... | G06F 11/1435 |
| | | | | 717/169 |
| 2012/0131639 A1* | 5/2012 | Alex | ................... | H04L 63/0892 |
| | | | | 726/3 |
| 2012/0254396 A1 | 10/2012 | Prahalad et al. | | |
| 2013/0031403 A1* | 1/2013 | Mordani | ................. | H04L 67/28 |
| | | | | 714/4.11 |

OTHER PUBLICATIONS

Tracy, Target Port Group Support (TPGS) in the Solaris OS, Jun. 2007.*

Andrew Beekhof, "Clusters from Scratch—Apache, DRBD and GFS2; Creating Active/Passive and Active/Active Clusters on Fedora 12," pacemaker@clusterlabs.org, 2009, last updated on Thursday, Mar. 11, 2010 for Pacemaker 1.0.5, http://clusterlabs.org/mw/Image:Configuration_Explained.pdf, pp. 1-81.

Andrew Beekhof, "Pacemaker 1.0 Configuration Explained; An A-Z guide to Pacemaker's Configuration Options," Pacemaker Edition 1, 2009, pp. 1-122.

* cited by examiner

STORAGE DEVICE FAILOVER

The present application claims the benefit of U.S. Provisional Appl. No. 61/898,187 filed on Oct. 31, 2013, which is incorporated by reference herein in its entirety.

BACKGROUND

Technical Field

This disclosure relates generally to accessing data on storage devices, and more specifically to failover mechanisms for storage devices.

Description of the Related Art

Various storage protocols have been developed to facilitate accessing data on storage devices. These protocols may define physical connections between computers and storages devices, bus bandwidth speeds, command sets for accessing storage devices, addressing schemes, etc. Some protocols may also implement security features and checksum capabilities to detect errors in written and read data. Examples of various storage protocols may include small computer system interface (SCSI), SCSI remote direct memory access (RDMA), Fibre Channel, etc.

Some storage protocols may employ various techniques to accommodate network and/or drive failures. In the case of SCSI, for example, a computing device that is accessing multiple storage devices may be able to detect a loss in connectivity with one of the devices when it fails to receive a response to an issued command. This loss of connectivity may be attributable to a failure in the path coupling the device to the drive or even a failure of the drive. In such an event, the computing device may notify the underlying SCSI system of the failure and further request that the system failover operation of the failed driver to a backup storage device so that the backup storage device is available to service subsequent storage requests. In many instances, supporting such a capability can improve the reliability of a storage system.

SUMMARY

The present disclosure describes embodiments of a storage system that supports failover functionality.

In one embodiment, a method is disclosed that includes representing a plurality of storage devices as cluster resources to a cluster resource manager that manages cluster resources on a plurality of cluster nodes. The method further includes receiving, at a resource agent, an indication that a failover operation is requested with respect to one of the plurality of storage devices and, in response to the indication, the resource agent causing the cluster resource manager to initiate the failover operation.

In another embodiment, an apparatus is disclosed that includes a management module and a communication module. The management module is configured to initialize a cluster resource manager configured to make a determination whether to fail over a cluster resource from a first cluster node to a second cluster node. In such an embodiment, the cluster resource corresponds to a logical disk having a logical unit number. The communication module is configured to receive a first request to fail over the cluster resource, and to provide, while the cluster resource manager is being initialized, an indication that the first request cannot be processed.

In yet another embodiment, a non-transitory computer readable medium is disclosed that has program instructions stored thereon. The program instructions are executable by a computing system to cause the computing system to perform operations. The operations include receiving a small computer system interface (SCSI) protocol request associated with a plurality of storage devices. The operations further include adjusting, based on the request, one or more parameters associated with a policy of the computing system, where the policy is used to determine a distribution of a plurality of resources across a plurality of computer systems. The operations further include sending an indication of the determined distribution to one or more of the plurality of computer systems. In such an embodiment, the indication is usable to perform a failover corresponding to a logical unit number of one of the plurality of storage devices.

In still another embodiment, a non-transitory computer readable medium is disclosed that has program instructions stored thereon. The program instructions are executable by a computing system of a cluster to cause the computing system to perform operations. The operations include receiving, at a kernel-level process, a request to change an access state associated with one or more storage devices. The operations further include, in response to the request, making, at a user-level cluster resource manager, a determination to fail over a cluster resource associated with the one or more storage device.

Figure 1:
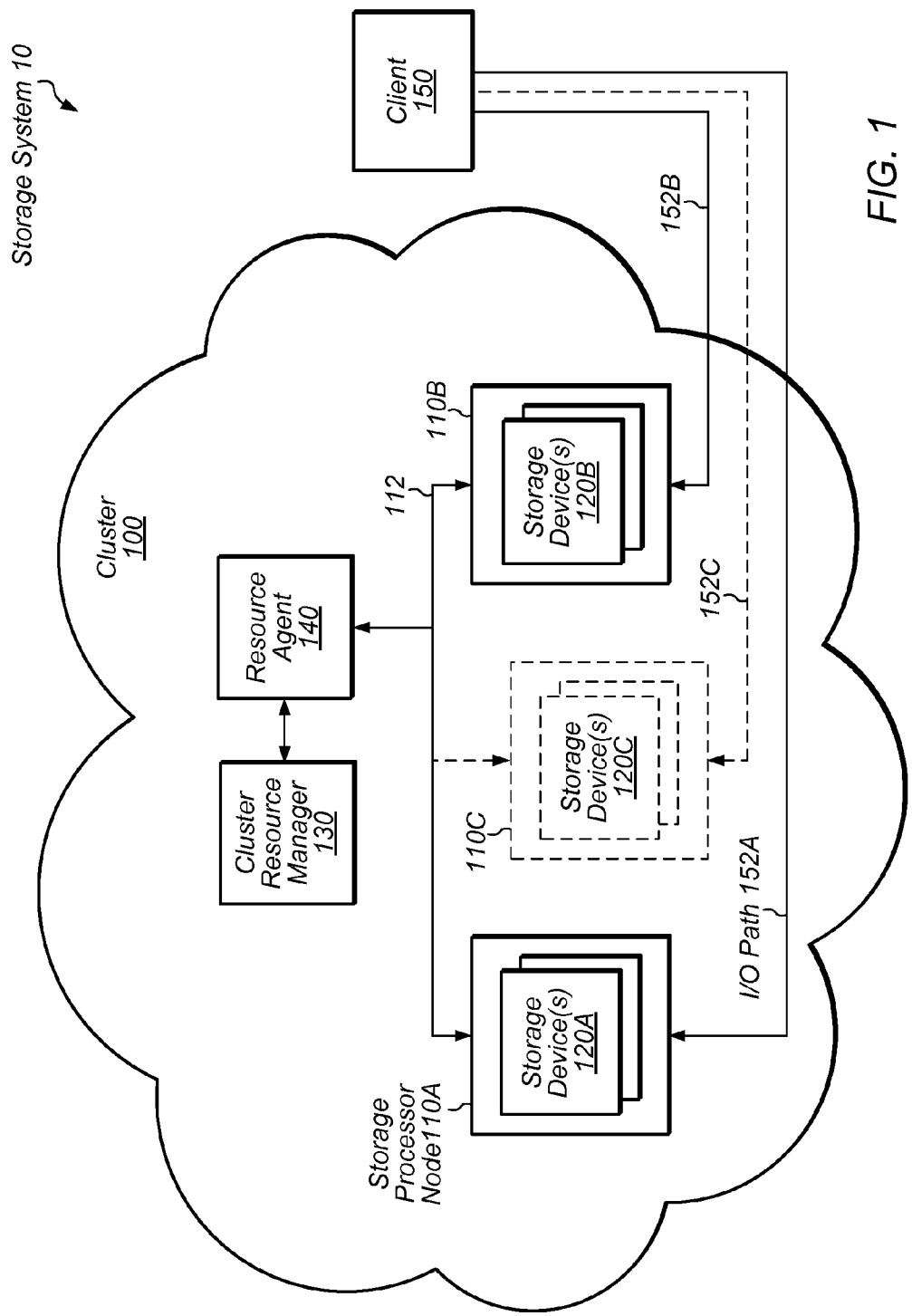
FIG. 1 is a block diagram illustrating one embodiment of a storage system implemented by a cluster.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

This disclosure also includes and references the accompanying drawings. In the drawings, similar symbols typically identify similar components, unless context dictates otherwise. The illustrative embodiments described in the detailed description, drawings, and claims are not meant to be limiting. Other embodiments may be utilized, and other changes may be made to these exemplary embodiments, without departing from the scope of the disclosure.

Various units, circuits, or other components in this disclosure may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to"

language include hardware—for example, circuits, memory storing program instructions executable to implement the operation, etc. Additionally, "configured to" can include generic structure (e.g., generic circuitry) that is manipulated by software and/or firmware (e.g., an FPGA or a general-purpose processor executing software) to operate in a manner that is capable of performing the task(s) at issue. Reciting that a unit/circuit/component is "configured to" perform one or more tasks is expressly intended not to invoke 35 U.S.C. §112, sixth paragraph, for that unit/circuit/component.

Various determinations described herein may be described using the term "based on" when referring to one or more factors that affect a determination. This term is intended to be open-ended and does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

The present disclosure describes embodiments in which a storage system may be implemented by a cluster that supports the ability to perform a failover of storage devices. The term "cluster" has its ordinary and accepted meaning in the art, and refers to a group of computing devices that are coupled together to perform one or more tasks. Individual ones of the computing devices may be referred to generally as "cluster nodes." Operation of the cluster may be managed by a cluster resource manager that executes on one or more of the cluster nodes. In managing the cluster, the cluster resource manager may track the health of individual cluster nodes and assign cluster resources to the cluster nodes accordingly. As will be described below, in various embodiments, storage devices within the storage system may be managed as cluster resources by the cluster resource manager.

To facilitate this management, in one embodiment, a resource agent may be executed that integrates an underlying storage protocol supported by the storage devices with the cluster resource manager, so that the storage devices are represented as cluster resources to the cluster resource manager. As part of this integration, the resource agent may provide information to the cluster resource manager that is usable to determine whether a cluster resource representing one or more storage devices should be failed over from one cluster node to another. In some embodiments, when such a determination is made, the resource agent may communicate with a driver implementing the underlying storage protocol to cause the storage devices to implement the failover.

Turning now to FIG. 1, a block diagram of a storage system 10 is depicted. In the illustrated embodiment, storage system 10 is implemented by a cluster 100 and includes a client 150. Cluster 100, in turn, includes multiple storage processor nodes 110 coupled together via an interconnect 112. Storage processor 110C is shown with a dotted line to indicate that cluster 100 may include three or more storage processor nodes 110, in some embodiments. As shown, cluster 100 may further include a cluster resource manager 130 and a resource agent 140.

Storage processor nodes 110, in one embodiment, are cluster nodes configured to provide access to storage devices 120 for one or more clients 150. In the illustrated embodiment, each storage processor node 110 is coupled to a client 150 via a respective input/output (I/O) path 152. Storage devices 120 may be any suitable type of storage device such as those discussed below with respect to FIG. 6. Similarly, I/O paths 152 may be any suitable form of interconnect such as those discussed below with respect to FIG. 6. In some embodiments, storage processor nodes 110 (or a subset of storage devices 120 within a storage processor node 110) may be addressable as a logical unit (i.e., a collection of one or more physical storage devices perceived by a client 150 as one storage device—also referred to herein as a "logical disk"). The address of this logical disk may be referred to generally as a logical unit number (LUN). Accordingly, a client 150 may issue read and write requests to storage processor node 110A by addressing a logical unit number (LUN) assigned to one or more storage devices 120 within that storage processor node 110. In some embodiments, only a portion of each storage device 120 may be allocated for logical disk use while other portions are used for some other purpose. For example, in one embodiment, each storage device 120 includes multiple partitions, where only one or more of those partitions are used to store data of the logical disk. In various embodiments, some or all of the data within a storage processor node 110 may be replicated across one or more other storage processor nodes 110. In some embodiments, data may be replicated in accordance with a redundant array of independent disks (RAID) scheme.

In some embodiments, storage processor nodes 110 (or storage devices 120 within the storage process nodes 110) may also be addressable as the same logical unit number and assigned primary and secondary roles that dictate responsibility for servicing requests from a client 150. For example, one storage processor node 110 may be identified as the preferred node 110 for a logical disk, while another storage processor node 110 may be identified as a non-preferred node 110 for the logical disk. Still further, in one embodiment, roles may be associated with I/O paths 152 rather than the storage processor nodes 110. For example, when storage processor nodes 110A and 110B have replicated data, I/O path 152A may be identified as the preferred path for servicing requests addressed to the logical unit number while I/O path 152B may be identified as a secondary path for the logical unit number. In some embodiments, a given storage processor node 110 (e.g., storage processor node 110A) may be coupled to a client 150 via multiple I/O paths 152 (e.g., multiple I/O paths 152A).

Cluster 100, in one embodiment, is configured as a high availability cluster. The term "high availability" connotes that the cluster may undergo minimal downtime by incorporating system redundancy. It also connotes a cluster's ability to fail over services from primary systems to secondary backup systems. For example, in the event of a failure, the cluster may fail over a cluster resource (e.g., a web server) on a first cluster node to a second cluster node by stopping execution on the first cluster node and starting execution on the second cluster node. In the illustrated embodiment, cluster 100 achieves high availability through using cluster resource manager 130. In various embodiments, cluster resource manager 130 manages operation of cluster 100 through monitoring the current state of cluster nodes (referred to generally as a node's "health") and determining whether to redistribute cluster resources as the state changes. In one embodiment, cluster resource manager 130 may monitor the health of storage processor nodes 110 by periodically communicating a signal (referred to as a heartbeat signal) between storage processor nodes 110. As will be described below with respect to FIG. 3, in one embodiment, cluster resource manager 130 includes a policy engine that continually evaluates current state information against a set of rules (referred to as a policy) to determine whether a failover of any cluster resources is warranted. In various embodiments, if cluster resource manager 130 determines that a failover is warranted, cluster resource manager 130 may stop (i.e., deactivate) the cluster resource on the cluster node experiencing problems and start (i.e., activate) another instance of the cluster resource on another cluster node. (Alternatively, cluster resource manager 130 may change the operating state of the entire cluster node (e.g., to a maintenance or standby state) and failover its resources over to other cluster nodes.) If the failure is subsequently corrected, cluster resource manager 130 may reactivate the cluster resource on the original cluster node (referred to as performing a "fallback"). Although depicted as a single block for illustration purposes, in various embodiments, cluster resource manager 130 is a distributed application that executes on multiple cluster nodes including storage processor nodes 110 and/or other cluster nodes independent of storage processor nodes 110. In some embodiments, cluster resource manager 130 may be implemented using existing high availability software such as Linux Pacemaker, VMware's vSphere®, etc.

In various embodiments, storage processor nodes 110 and storage devices 120 implement a storage protocol that supports performing a failover with respect to storage devices 120. In some embodiments, the failover functionality is implemented independently of the failover functionality of cluster resource manager 130. As will be described below with respect to FIG. 2, in one embodiment, the storage protocol supports a command that enables a client 150 to query the access states of storage processor nodes 110 (or storage devices 120 within those nodes). As used herein, the term "access state" refers generally to whether a storage processor node or storage device is able to service requests from other devices. An access state may also refer to what extent a device is accessible—e.g., a storage device may be in a standby access state for another storage device that is an active access state. An access state may also be referred to more generally as an access characteristic. If a client 150 fails to receive a response to a query for access states, client 150 may determine that a failure exists with storage system 10—this failure may be attributable to a failure of a storage device 120, a failure of a storage processor node 110, and/or a failure of an I/O path 152. In some embodiments, client 150 may alternatively determine that a failure has occurred after issuing a write or read request that fails to complete (e.g., client 150 receives no acknowledgement for the request). In one embodiment, the storage protocol supports another command that allows a client 150 to request a failover. When client 150 issues the command, in one embodiment, a storage device 120 associated with the failure may be deactivated (e.g., the access state of storage device 120A may be changed to a standby state if it is still operational), and a non-active storage device 120 may be activated (e.g., the access state of a storage device 120B may be changed from standby to available so that it now services data requests). In the case when the second storage device 120 is a replica of the first storage device 120, client 150 may be able to resume operation and access data without significant interruption. In some embodiments, the implemented storage protocol may be an existing storage protocol such as the small computer system interface (SCSI) protocol discussed below with respect to FIG. 2.

Resource agent 140, in one embodiment, integrates cluster resource manager 130 with the underlying storage protocol supported by storage processor nodes 110 and storage devices 120. That is, in various embodiments, cluster resource manager 130 lacks support for integrating directly with the underlying storage protocol—e.g., cluster resource manager 130 may be unable to communicate with the underlying driver managing storage devices 120; it may also be unaware that the cluster resources it is managing are representative of one or more storage devices 120. As will be described below, in one embodiment, resource agent 140 implements integration by providing status information to cluster resource manager 130 so that it can manage storage devices 120 as cluster resources. In some embodiments, resource agent 140 provides this information though adjusting one or more parameters associated with the cluster resources to influence cluster resource manager 130's analysis of whether to failover the cluster resources. For example, as discussed below, when a client 150 has requested a failover, resource agent 140 may modify parameters usable by cluster resource manager 130 in determining to failover a cluster resource to cause cluster resource manager 130 to determine that a failover is warranted. In one embodiment, once such a determination is made, resource agent 140 may further communicate with the underlying driver of storage devices 120 to cause it to relay the appropriate commands to perform the failover. In some embodiments, resource agent 140 may be implemented as a plug-in that integrates into cluster resource manager 130; however, in other embodiments, resource agent 140 may be implemented differently.

In various embodiments, resource agent 140's ability to integrate with cluster resource manager 130 allows cluster 100 to implement a high-availability storage system with respect to storage processor nodes 110. In some instances, this integration may also provide a cost effective approach for developing a cluster with one or more off-the-shelf components. In some embodiments, as noted above, resource agent 140 may also permit using more than two storage processor nodes 110.

Figure 2:
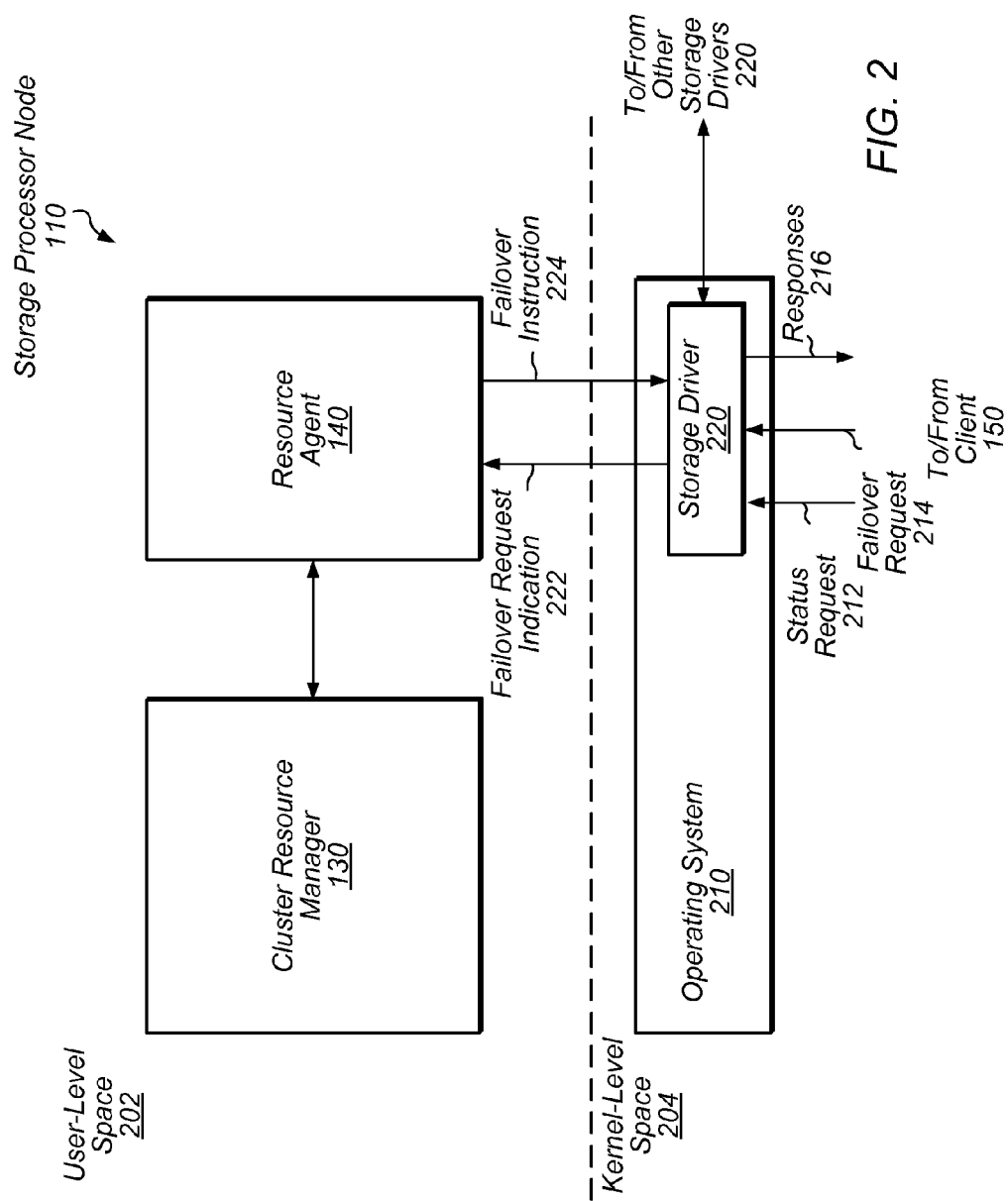
FIG. 2 is a block diagram illustrating one embodiment of a storage processor node within the cluster.

Turning now to FIG. 2, a block diagram of a storage processor node 110 is depicted. As shown, storage processor node 110 may include an instance (i.e., copy) of cluster resource manager 130, an instance of resource agent 140, and an operating system 210 with an instance of storage driver 220. In the illustrated embodiment, cluster resource manager 130 and resource agent 140 execute in a user-level space 202 while operating system 210 and storage driver 220 execute in a kernel-level space 204. As used herein, a "user-level space" (or application-level space) refers to a classification of applications (i.e., processes) that execute with restricted privileges (e.g., restricted access to files, addresses, hardware, etc.) and typically includes applications that are not responsible for management of the computer system. Examples of user-level applications may include, for example, database servers, web servers, etc. For security reasons, most applications typically run as user-level applications. In contrast, "kernel-level space" (or system-level space) refers to a classification of applications that execute with unrestricted privileges and typically includes applications responsible for system management. Examples of kernel-level applications may include an operating system, drivers, a hypervisor, etc. In one embodiment, OS 210 is responsible for classing applications on a storage processor node 110 into one of spaces 202 or 204. In some embodiments, storage processor node 110 may be configured differently than shown—e.g., storage driver 220 may be external to operating system 210.

Storage driver 220, in one embodiment, manages operation of storage devices 120 and interfacing with client 150.

Accordingly, storage driver 220 may receive read and write requests from a client 150 and issue corresponding commands to storage devices 120 to service those requests. In some embodiments, storage driver 220 may further coordinate replication of data across storage devices 120 (which may be in separate storage processor nodes 110 or may be within the same storage processor node 110). In one embodiment, storage driver 220 implements replication using a distributed replicated block device (DRBD) to replicate data across storage devices 120. In such an embodiment, storage driver 220 may replicate contents of every logical block address (LBA) of a storage device 120A to a storage device 120B, for example.

In various embodiments, storage driver 220 is further configured to perform a failover of storage devices 120 in one storage processor node 110 to storage devices 120 in another storage processor node 110. As discussed above, in one embodiment, such a failover may be a failover of storage devices with replicated data and assigned to the same logical unit number. As will be described below, in the illustrated embodiment, storage driver 220 exchanges failover information with client 150 via status requests 212, failover requests 214, and responses 216. In some embodiments, indications 212-216 are in accordance with a SCSI protocol such that storage driver 220 implements a SCSI target engine and/or a SCSI core and client 150 implements a SCSI initiator. In other embodiments, storage driver 220 may implement other suitable storage protocols, however.

Status request 212, in one embodiment, is a request for an access state of storage devices 120 in a storage processor node 110. As noted above, in one embodiment, storage devices 120 within a storage processor node 110 may operate in one of multiple access states—e.g., an available access state, a standby access state, a non-accessible access state, etc. When storage driver 220 receives a status request 212, storage driver 220 may convey a corresponding response 216 (discussed below) indicating the access state to the requesting client 150. In some embodiments, storage driver 220 supports implicit Asymmetric Logical Unit Assignment (ALUA) such that status requests 212 are the REPORT TARGET PORT GROUPS (RTPG) command—storage devices 120 may thus have the following access states: Active/Optimized, Active/Non-optimized, Standby, Unavailable, and In-Transition. In various embodiments, client 150 may issue status requests 212 to determine whether a failure has occurred with respect to a storage processor node 110. In one embodiment, if no response 216 is received within a given time window, then client 150 may presume that storage processor node 110 is unavailable. Once client 150 determines that a failure has occurred, client 150 may further determine that a failover is warranted.

Failover request 214, in one embodiment, is a request for storage driver 220 to perform a failover of storage devices 120. In some embodiments, a failover request 214 may cause performance of a failover by specifying a change in access states for storage devices 120 in a storage processor node 110—e.g., changing storage devices 120A to a standby access state and storage devices 120B to an active access state. In some embodiments, a failover request 214 may be specified with respect to I/O paths 152 rather than storage devices 120 or storage processor nodes 110. For example, in one embodiment in which storage processor nodes 110A and 110B collectively implement a logical disk with replicated data, a failover request 214 may specify that I/O path 152A be changed from a preferred path for servicing data requests to a non-preferred path and that I/O path 152B be changed to the preferred path for servicing requests to the logical disk. In doing so, storage devices 120B may begin servicing storage requests for the logical disk while storage device 120A become inactive. In some embodiments, storage driver 220 supports explicit ALUA such that failover requests 214 are the SET TARGET PORT GROUPS (STPG) command. As will be discuss below, in one embodiment, once storage driver 220 receives a failover request 214, storage driver 220 may confer with resource agent 140 prior to implementing the failover. Storage driver 220 may also issue a corresponding response 216.

Responses 216, in one embodiment, are responses to status requests 212 or failover requests 214. As noted above, in the case in which a client 150 has submitted a status request 212, in one embodiment, a response 216 may specify access states of storage processor nodes 110 (or storage devices 120 within the storage processor nodes 110). In the case in which a failover request 214 has been submitted, in one embodiment, a response 216 may specify a confirmation that the failover has been completed. In some embodiments, the request 216 may further specify the new access state for the storage devices 120. In one embodiment, rather than waiting until a failover has completed, storage driver 220 may issue a response 216 specifying that a failover is in-transition (i.e., that a failover has been initiated but has not yet been completed). Storage driver 220 may then complete the failover at a subsequent, appropriate time—delaying performance of the failover may thus be described as being asynchronous with respect to a failover over request 214. In one embodiment, storage driver 220 may provide such a response 216 in accordance with the American National Standards Institute (ANSI) T10 standard. In one embodiment, storage driver 220 may provide a follow-up response 216 after the failover has been performed. In another embodiment, client 150 issues another status request 212 to confirm whether the failover has been completed.

In various embodiments, storage driver 220 is modified to communicate failover information with resource agent 140 in user-level space 202. In the illustrated embodiment, this information includes failover request indications 222 and failover instructions 224; in other embodiments, different information may be exchanged. In some embodiments, communicating this information through up-calls from kernel-level space 204 and down-calls from user-level space 202 allows cluster resource manager 130 to execute in user-level space 202. In some embodiments, executing cluster resource manager 130 as a user-level application makes testing, deploying and upgrading storage system 10 easier.

Failover request indication 222, in one embodiment, is an indication sent to resource agent 140 in response to storage driver 220 receiving a failover request 214. In some embodiments, a failover request indication 222 may specify various information about the requested failover, such as the storage processors nodes 110 that are to participate in the failover, preferred path information, a desired access state for storage devices 120, an identifier of the requesting client 150, etc. In one embodiment, storage driver 220 causes operating system 210 to invoke (i.e., initiate execution of) resource agent 140 in response to receiving a failover request 214 in order to convey a failover request indication 222. For example, storage driver 220 may raise an interrupt causing operating system 210 to perform a context switch to resource agent 140. As will be described with respect to FIG. 3, after receiving a failover request indication 222, in various embodiments, resource agent 140 may adjust parameters used by cluster resource manager 130 in determining whether to initiate a failover in order to cause cluster resource manager 130 to determine that one is warranted.

Failover instruction 224, in one embodiment, is an instruction (i.e., command) conveyed by resource agent 140 after cluster resource manager 130 has determined that a failover is warranted in order to cause storage driver 220 to implement the failover. Such an instruction may be conveyed after cluster resource manager 130 has determined to perform a failover responsive to a received failover request 214 or may also be conveyed after cluster resource manager 130 has determined to perform a failover independently of any received failover request 214. In some embodiments, failover instructions 224 identify the storage devices 120 associated with the failover and further specify a desired access state for the storage devices 120. In one embodiment, once storage driver 220 has received a failover instruction 224, storage driver 220 may change the access state of storage devices 120 for storage processor node 110 to reflect the failover. In some embodiments, storage driver 220 may notify other instances of storage driver 220 in other storage processor nodes 110 of the change as shown; in other embodiments, however, other instances of resource agent 140 may convey a respective failover instruction 224 to each instance of storage driver 220. As noted above, in some embodiments, storage driver 220 may issue a response 216 upon completion of the failover. Still further, in some embodiments, storage driver 220 may issue a response 216 that the failover is in transition (as discussed above) responsive to receiving a failover instruction 224 and then issue a subsequent response 216 upon completion of the failover.

In various embodiments, startup and shutdown of storage driver 220, cluster resource manager 130, and/or resource agent 140 may be coordinated on a storage processor node 110 in order to prevent potential deadlock. Accordingly, in one embodiment, during system startup, storage processer node 110 may not attempt to process requests 212 and 214 until each of storage driver 220, cluster resource manager 130, and resource agent 140 has been initialized—thus preventing the situation in which a request 212 or 214 is received before it can be processed. In such an embodiment, if storage driver 220 has been initialized (or has been, at least, partially initialized), but cluster resource manager 130 has not, storage driver 220 may respond to a received request 212 or 214 by providing a response 216 indicating that the request cannot be processed (e.g., is being denied). In some embodiments, a client 150 may later resubmit the request 212 or 214 in response receiving such a response 216. In some embodiments, if the request is a failover request 214, storage driver 220 may instead submit a response 216 indicating that the failover is in transition and then later process the request when appropriate (i.e., process the request asynchronously as discussed above). In one embodiment, during system shutdown, storage processor node 110 may stop accepting requests 212 and 214 before stopping execution of storage driver 220, cluster resource manager 130, and resource agent 140—thus preventing a request from being received and partially processed. In some embodiments, storage driver 220 may prevent accepting requests 212 and 214, by closing a communication port (e.g., a network port such a transmission control protocol (TCP) or a user datagram protocol (UDP) port) through which request 212 and 214 are received.

Figure 3:
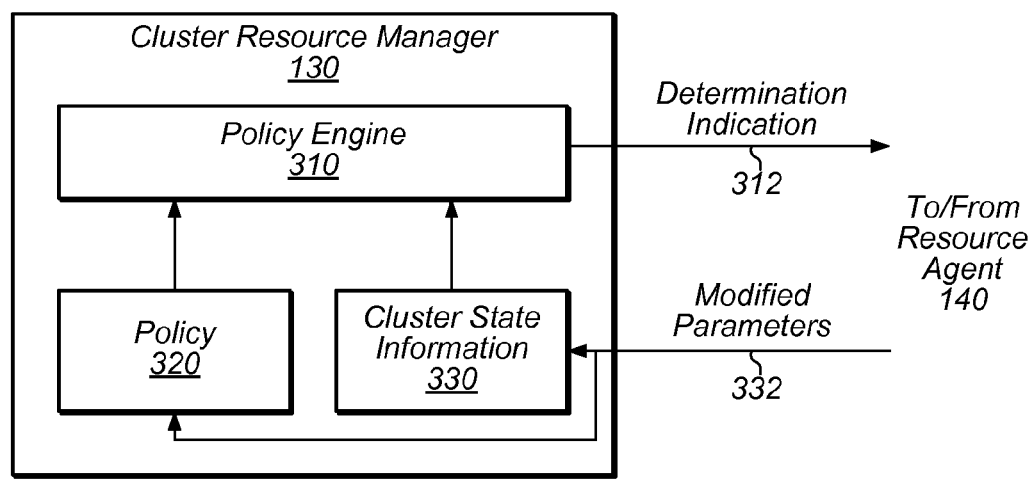
FIG. 3 is a block diagram illustrating one embodiment of a cluster resource manager that interacts with a resource agent within the cluster.

Turning now to FIG. 3, a block diagram of cluster resource manager 130 is depicted. As noted above, in various embodiments, cluster resource manager 130 is responsible for managing cluster resources of cluster 100 including determining whether failovers are warranted for cluster resources such as those representative of storage devices 120. In the illustrated embodiment, cluster resource manager 130 includes a policy engine 310, policy 320, and cluster state information 330. In other embodiments, cluster resource manager 130 may be arranged differently.

Policy engine 310, in one embodiment, is responsible for making management determinations about cluster 100. These determinations may be made with respect to adjusting the access states of a cluster resource by starting or stopping it, promoting or demoting it, etc. Policy engine 310 may also determine whether to failover cluster resources from one cluster node to the next. In the illustrated embodiment, policy engine 310 makes determinations by evaluating policy 320 against current state information 330.

Policy 320, in one embodiment, is a set of rules that govern when cluster resource manager 130 is to perform various actions based on current state information 330. These rules may take one of multiple forms. In one embodiment, policy 320 may include score-based rules that dictate performance of an operation after a particular threshold value is satisfied. For example, policy 320 may include a rule specifying that a cluster resource be restarted on a cluster node if its health has deteriorated beyond a particular threshold. Such rules may be used to establish a preference for running a cluster resource on one node over another node. In one embodiment, policy 320 may also include rules that specify constraints for a given cluster resource. For example, such a rule may specify that two particular cluster resources are not to be run on the same cluster node. In one embodiment, policy 320 may also include rules that establish a dependency between cluster resources and/or cluster nodes. Such a rule may dictate, for example, that a first cluster resource and a second cluster resource are related such that, in the event of a failover, the first cluster resource is to be failed over to the second cluster resource.

Cluster state information 330, in one embodiment, is information about the current state of cluster nodes and/or cluster resources within cluster 100. In some embodiments, this information includes numeric values (e.g., scores) that can be evaluated against threshold values specified in rules of policy 320. For example, cluster state information 330 may include a health score for storage processor node 110 that is adjusted depending upon whether storage processor node 110 is responding to a heartbeat signal. As this score changes over time, policy 320 may dictate that particular actions such as a failover be performed based on this score. In some embodiments, policy 320 and cluster state information 330 may correspond to Pacemaker's cluster information base (CIB).

Resource agent 140, in one embodiment, modifies parameters 332 to influence determinations made by policy engine 310 with respect to the failover of cluster resources representative of storage devices 120. In the illustrated embodiment, modification of these parameters 332 may include the insertion or modification of rules within policy 320 as well as the adjustment of cluster state information 330 pertaining to storage processor nodes 110 and storage devices 120. For example, in one embodiment, resource agent 140 may insert one or more rules for a first cluster resource representative of one or more of storage devices 120A. The one or more rules may specify that the first cluster resource be stopped responsive to cluster state information 330 about storage processor node 110A or storage devices 120A satisfying one or more criteria (e.g., scores meeting particular specified thresholds). Resource agent 140 may further insert a rule specifying that the first cluster resource is related to a second cluster resource representing one or more of storage devices 120B such that, if the one or more rules dictate that the first cluster resource is to be stopped, the second cluster resource is to be started (i.e., the first cluster resource representing storage devices 120A is to be failed over to the second cluster resource representing storage devices 120B). In some embodiments, resource agent 140 insert a rule established this relations if storage devices 120A and 120B (or storage processor nodes 110A and 110B) are assigned to the same logical unit number with replicated data.

As noted above, in various embodiments, resource agent 140 further modifies parameters responsive to receiving a failover request indication 222. In one embodiment, this may include modifying one or more scores in cluster state information 330 pertaining to storage processor nodes 110 and/or storage devices 120. For example, if client 150 has requested a failover of storage devices 120A to storage devices 120B, resource agent 140 may a lower score relating to storage devices 120A below a threshold value to influence policy engine 310. Based on this change, policy engine 310 may determine to initiate a failover for a cluster resource representative of storage devices 120A in accordance with a rule in policy 320 specifying such an action. Policy engine 310 may then initiate the failover to cluster resource representative of storage devices 120B in accordance with a relationship rule in policy 320.

Determination indication 312, in one embodiment, is an indication that policy engine 310 has determined to initiate a failover for a cluster resource associated within storage devices 120. Such an indication may be issued responsive to a modification of parameters 332 by resource agent 140 or may be issued independent of any modification by resource agent 140—e.g., responsive to a loss of heartbeat from a storage processor node 110. In one embodiment, determination indication 312 identifies the cluster resources associated with the failover and cluster nodes to which those resources are to be distributed. In some embodiments, upon policy engine 310 making a determination, cluster resource manager 130 invokes resource agent 140 to provide it with determination indication 312. In various embodiments, after receiving a determination indication 312, resource agent 140 may convey a corresponding failover instruction 224 to storage driver 220 to cause it to implement the failover as discussed above.

Figure 4:
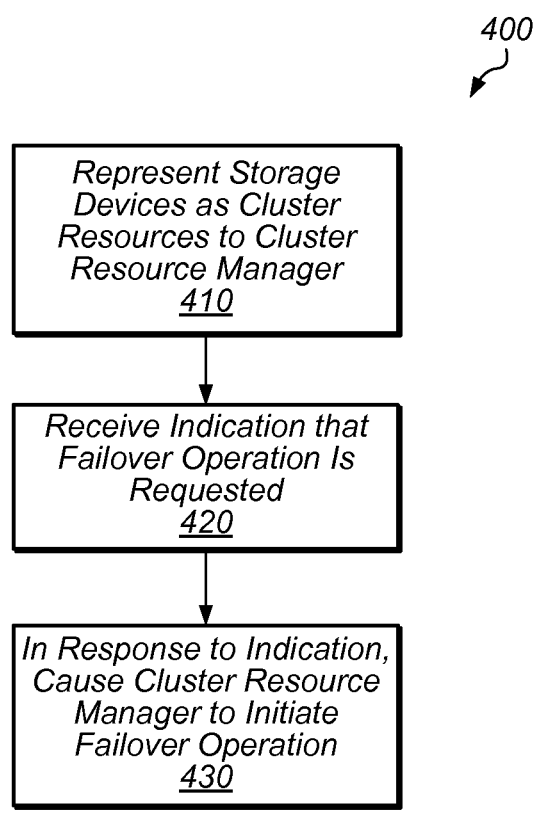
FIG. 4 is a flow diagram illustrating one embodiment of a method that may be performed by the resource agent.

Turning now to FIG. 4, a flow diagram of a method 400 is depicted. Method 400 is one embodiment of a method that may be performed by a computing system such as cluster 100 or storage process node 110. In some embodiments, performance of method 400 may enable a cluster resource manager to be integrated with a storage device driver that supports performance of a failover operation. In some embodiments, performance of method 400 may enable a cluster resource manager to execute as a user-level application as discussed above.

In step 410, a plurality of storage devices (e.g., storage devices 120) are represented as cluster resources to a cluster resource manager (e.g., cluster resource manager 130) that manages cluster resources on a plurality of cluster nodes (e.g., storage processor nodes 110). In one embodiment, step 410 may include inserting one or more rules about cluster resources representative of the storage devices into a policy (e.g., policy 320) of the cluster resource manager and providing cluster state information (e.g., modified parameters 332) about those cluster resources. In various embodiments, the plurality of cluster nodes includes three or more cluster nodes that include ones of the plurality of storage devices.

In step 420, an indication (e.g., failover request indication 222) is received that a failover operation is requested (e.g., via a failover request 214) with respect to one of the plurality of storage devices. In one embodiment, such an indication is received by a user-level agent (e.g., resource agent 140) that communicates with a system-level driver (e.g., storage driver 220) for one or more the plurality of storage devices and communicates with the cluster resource manager. In some embodiments, step 420 may include prior to an initialization of the cluster resource manager, receiving a request to perform a failover operation (e.g., a failover request 214) and denying the request in response to the cluster resource manager not being initialized.

In step 430, in response to the indication, the cluster resource manager is caused (e.g., by resource agent 140) to initiate the failover operation. As discussed above, in one embodiment, the failover operation includes changing a first access state of the storage device (e.g., to an inactive or standby access state) and a second access state of another storage device (e.g., to an active access state), where the storage device and the other storage device are associated with a logical unit number. In some embodiments, the storage device is located within a first of the plurality of cluster nodes (e.g., a storage device 120A in storage processor node 110A), and the other storage device is located within a second of the plurality of cluster nodes (e.g., a storage device 120B in storage processor node 110B). In such an embodiment, content of the storage device is replicated to the other storage device. In various embodiments, step 430 includes adjusting one or more parameters (e.g., modified parameters 332) for the cluster resources, the one or more parameters being usable by the cluster resource manager to determine whether to fail over a cluster resource from one cluster node to another cluster node.

Figure 5:
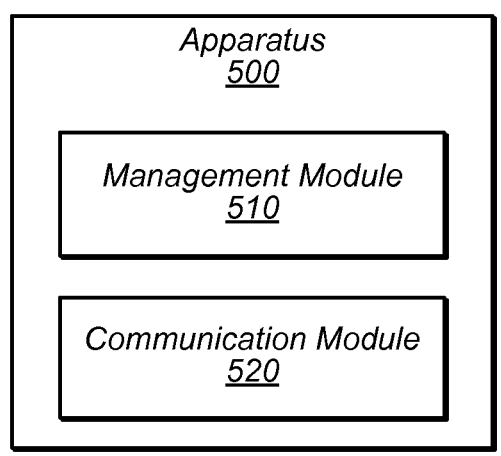
FIG. 5 is a block diagram illustrating one embodiment of an apparatus having a management module and an agent module.

Turning now to FIG. 5, a block diagram of an apparatus 500 that includes modules is depicted. As used herein, the term "module" refers to circuitry configured to perform operations or a memory having program instructions stored therein that are executable by one or more processors to perform operations. Accordingly, a module may be implemented as a hardware circuit implemented in a variety of ways. The hardware circuit may include, for example, custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, or the like. A module may also be any suitable form of non-transitory computer readable media storing program instructions executable to perform specified operations. Apparatus 500 may include modules to implement any of the functionality described herein. For example, in the illustrated embodiment, apparatus 500 includes a management module 510 and a communication module 520.

Management module 510, in one embodiment, is configured to initialize a cluster resource manager (e.g., cluster resource manager 130) that makes a determination whether to fail over a cluster resource from a first cluster node to a second cluster node (e.g., storage processor nodes 110A and 110B). In some embodiments, the cluster resource corresponds to a logical disk having a logical unit number.

Communication module 520 may implement any functionality described above with respect to resource agent 140 and/or storage driver 220. In one embodiment, communication module 520 is configured to receive a first request (e.g., a failover request 214) to fail over the cluster resource, and to provide, while the cluster resource manager is being initialized, an indication (e.g., a response 216) that the first request cannot be processed. In some embodiments, the provided indication causes an initiator (e.g., a client 150) of the first request to resubmit a second, subsequent request to fail over the cluster resource. In one embodiment, communication module 520 is configured to determine that a shutdown associated with the cluster resource manager (e.g. a shutdown of a cluster node 110) has been initiated, and to prevent processing requests (e.g., failover requests 214) to fail over cluster resources. In some embodiments, communication module 520 is configured to prevent processing the requests by closing a port (e.g., a network port) used to receive requests to fail over cluster resources. In one embodiment, communication module 520 is further configured to receive a second request to fail over another cluster resource, and to provide an indication (e.g., a response 216) that the second request has been processed before the failover of the other cluster resource has been performed (i.e., the failover is performed asynchronously).

In some embodiments, apparatus 500 may include additional modules that implement functionality described herein. Accordingly, in one embodiment, apparatus 500 includes an agent module configured to communicate an indication of the determination (e.g., a failover instruction 224) to a small computer system interface (SCSI) core (e.g., implemented by storage driver 220) configured to manage one or more storage devices associated with a logical unit number. In some embodiments, apparatus 500 may also include a replication module configured to replicate data of the storage device in the first cluster node on the storage device in the second cluster node.

Figure 6:
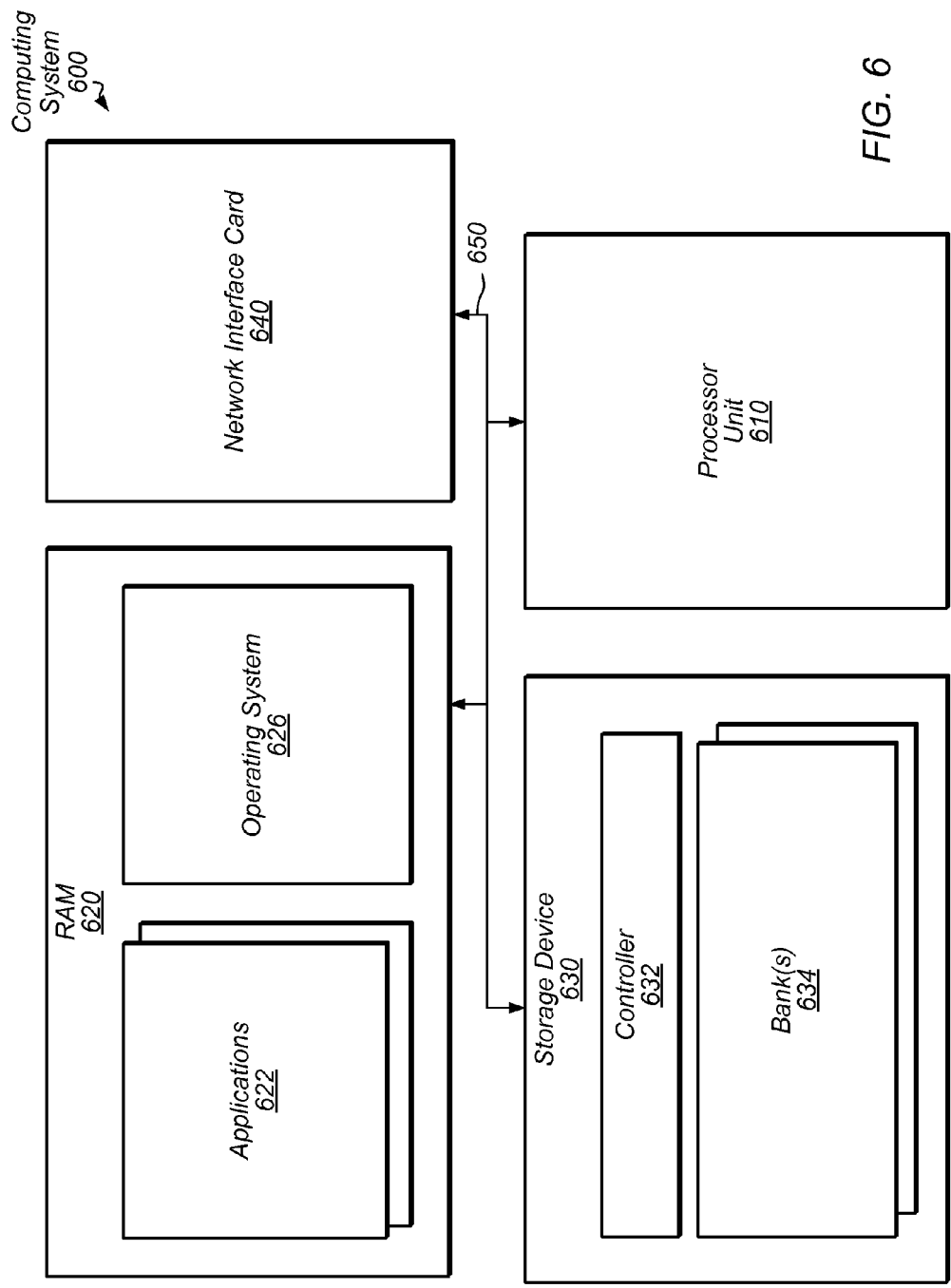
FIG. 6 is a block diagram illustrating one embodiment of an exemplary computing system that may be used to implement components of the storage system.

Turning now to FIG. 6, a block diagram of an exemplary computing system 600 is depicted. Computing system 600 is one embodiment of a computing system that may implement components of storage system 10 such one or more storage processor nodes 110 and/or client 150. Computing system 600 may be any suitable type of computing device such as a server, laptop, desktop, a mobile device, etc. In the illustrated embodiment, computing system 600 includes a processor unit 610, random access memory (RAM) 620, storage device 630, and network interface card (NIC) 640 coupled together via an interconnect 650. As shown, RAM 620 may include program instructions for one or more applications 622 and an operating system 626.

Storage device 630 is representative of any physical medium upon which data can be recorded and may correspond to storage devices 120 discussed above. In some embodiments, storage devices 630 may be implemented such that it includes non-volatile memory such as hard disk drives (e.g., Integrated Drive Electronics (IDE) drives, Small Computer System Interface (SCSI) drives, Serial Attached SCSI (SAS) drives, Serial AT Attachment (SATA) drives, etc.), tape drives, writable optical drives (e.g., CD drives, DVD drives, Blu-Ray drives, etc.) etc. In some embodiments, storage devices 630 may be implemented such that it includes non-volatile solid-state memory. Accordingly, in such an embodiment, storage banks 634 may include any suitable type of solid-state storage media including, but not limited to, NAND flash memory, NOR flash memory, nano RAM (NRAM), magneto-resistive RAM (MRAM), phase change RAM (PRAM), Racetrack memory, Memristor memory, nanocrystal wire-based memory, silicon-oxide based sub-10 nanometer process memory, graphene memory, Silicon-Oxide-Nitride-Oxide-Silicon (SONOS), Resistive random-access memory (RRAM), programmable metallization cell (PMC), conductive-bridging RAM (CBRAM), etc. In some embodiments, storage devices 630 may be implemented such that it includes volatile memory such as RAM, dynamic RAM (DRAM), static RAM (SRAM), synchronous dynamic RAM (SDRAM), etc.

Controller 632, in one embodiment, is configured to manage operation of storage device 630. Accordingly, controller 632 may facilitate performance of read operations at specified addresses including selecting the appropriate banks 634 and accessing the data within the appropriate cells within those banks. Controller 632 may support any suitable interconnect type such as a peripheral component interconnect (PCI), PCI express (PCI-e), serial advanced technology attachment ("serial ATA" or "SATA"), parallel ATA (PATA), small computer system interface (SCSI), IEEE 1394 (FireWire), Fiber Channel, universal serial bus (USB), etc. In various embodiments, controller 632 may be used to perform a replication process, for example, writing the contents of another storage device to storage device 630.

Applications 622, in one embodiment, include program instructions that are executable by processor unit 610. In some embodiments, applications 622 may include cluster resource manager 130, resource agent 140, storage driver 220, etc. Operating system 626 may also correspond to operating system 210 discussed above.

Network interface card 640, in one embodiment, is configured to enable computing system 600 to communicate with other computing systems via computer network. Network interface card 640 may support any suitable network protocol including wired protocols (such as Ethernet, Fibre Channel, etc.) and/or wireless protocols (Bluetooth®, WiFi®, WiMax®, Long Term Evolution (LTE), etc.).

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
representing a plurality of storage devices as resources of a cluster, to a cluster resource manager executing within the cluster, that manages cluster resources on a plurality of cluster nodes, the cluster resource manager executing as a user-level application;
receiving, at a kernel-level storage driver executing within the cluster, a request from a client outside the cluster for a failover operation with respect to one of the plurality of storage devices, the failover operation requested by the client in response to the client detecting that a failure relating to the plurality of storage devices has occurred;

in response to the request, causing the cluster resource manager to initiate the failover operation; and
providing, before the failover operation has been performed, a response to the client indicating that the request has been processed.

2. The method of claim 1, wherein:
the failover operation includes changing a first access state of the storage device and a second access state of another storage device; and
the storage device and the other storage device are associated with a logical unit number.

3. The method of claim 1, further comprising:
prior to an initialization of the cluster resource manager, receiving a request to perform a failover operation; and
denying the request in response to the cluster resource manager not being initialized.

4. The method of claim 1, wherein:
a resource agent enables the cluster resource manager to execute as a user-level application; and
the resource agent communicates with the kernel-level storage driver of one or more of the plurality of storage devices and communicates with the cluster resource manager.

5. The method of claim 1, wherein:
the causing includes adjusting one or more parameters for the cluster resources; and
the one or more parameters are usable by the cluster resource manager to determine whether to fail over a cluster resource from one cluster node to another cluster node.

6. The method of claim 1, wherein:
the plurality of cluster nodes includes three or more cluster nodes; and
the three or more cluster nodes include one or more storage devices within the plurality of storage devices.

7. An apparatus, comprising:
a management module configured to initialize a cluster resource manager for a cluster, the cluster resource manager executing within the cluster as a user-level application, the cluster resource manager configured to make a determination whether to fail over a cluster resource from a first cluster node to a second cluster node, wherein the cluster resource corresponds to a logical disk having a logical unit number; and
a communication module configured to:
use a kernel-level storage driver to receive a first request within the cluster, from a client outside the cluster, to fail over the cluster resource, the request submitted by the client in response to the client detecting that a failure relating to the cluster resource has occurred; and
provide, while the cluster resource manager is being initialized, a response to the client, the response indicating that the first request cannot be processed.

8. The apparatus of claim 7, wherein the provided response causes the client to submit a second, subsequent request to fail over the cluster resource.

9. The apparatus of claim 7, wherein the communication module is further configured to:
determine that a shutdown associated with the cluster resource manager has been initiated; and
prevent processing requests to fail over cluster resources.

10. The apparatus of claim 9, wherein the communication module is further configured to prevent processing the requests by closing a port used to receive requests to fail over cluster resources.

11. The apparatus of claim 7, further comprising:
an agent module configured to communicate an indication of the determination to a small computer system interface (SCSI) core configured to manage one or more storage devices associated with the logical unit number.

12. The apparatus of claim 7, wherein the communication module is further configured to:
receive a second request to fail over another cluster resource; and
provide a response to the client, the response indicating that the second request has been processed before the failover of the other cluster resource has been performed.

13. A non-transitory computer readable medium having program instructions stored thereon, wherein the program instructions are executable by a computing system to cause the computing system to perform operations comprising:
receiving a small computer system interface (SCSI) protocol request associated with a plurality of storage devices, the request received by a kernel-level storage driver for a cluster comprising the plurality of storage devices, the SCSI protocol request issued by a client separate from the cluster in response to the client detecting that a failure relating to the plurality of storage devices has occurred;
adjusting, based on the request, one or more parameters associated with a policy of the computing system, wherein the policy is used to determine a distribution of a plurality of resources across a plurality of computer systems;
sending an indication of the determined distribution to one or more of the plurality of computer systems, wherein the indication is usable for a user-level cluster resource manager to perform a failover corresponding to a logical unit number of one of the plurality of storage devices; and
providing, before the failover has been performed, a response to the client indicating that the request has been processed.

14. The computer readable medium of claim 13, wherein:
the policy includes one or more rules specifying a relationship between storage devices within a first computer system of the plurality of computer systems and storage devices in a second computer system of the plurality of computer systems; and
the adjusting of the one or more parameters causes a change in the distribution according to the one or more rules.

15. The computer readable medium of claim 14, wherein:
the one or more parameters includes a first score of the first computer system; and
the distribution is determined responsive to the first score satisfying a threshold.

16. The computer readable medium of claim 13, wherein the received request is a set target port groups (STPG) command.

17. A non-transitory computer readable medium having program instructions stored thereon, wherein the program instructions are executable by a computing system of a cluster to cause the computing system to perform operations comprising:
receiving, at a kernel-level storage driver, a request to change an access state associated with one or more storage devices, the request received by a cluster comprising the one or more storage devices, the request sent by a client outside of the cluster in response to the client detecting that a failure relating to the one or more storage devices has occurred;

in response to the request, making, at a user-level cluster resource manager, a determination to fail over a cluster resource associated with the one or more storage devices; and providing, before failing over the cluster resource has been performed, a response to the client indicating that the request has been processed.

18. The computer readable medium of claim 17, wherein the operations further comprise:

conveying an indication of the determination to the kernel-level storage driver, wherein the conveying is via a resource agent of the user-level cluster resource manager.

19. The computer readable medium of claim 17, wherein the cluster resource corresponds to a logical disk associated with the one or more storage devices.

20. The computer readable medium of claim 17, wherein the operations further comprise:

waiting to process requests to change access states until the kernel-level storage driver and the user-level cluster resource manager are executing.

\* \* \* \* \*